US005551812A

United States Patent [19]

Basteck

[11] Patent Number: 5,551,812
[45] Date of Patent: Sep. 3, 1996

[54] SINGLE-BLADE REAMER

[76] Inventor: Andreas Basteck, Ebingor Str. 115, D-72474 Winterlingen, Germany

[21] Appl. No.: 297,448

[22] Filed: Aug. 29, 1994

[30] Foreign Application Priority Data

Feb. 9, 1993 [DE] Germany ............ 43 29 553.3

[51] Int. Cl.$^6$ ............................................. B23B 41/00
[52] U.S. Cl. ............................ 408/199; 408/83; 408/145
[58] Field of Search ............................. 451/461, 462; 408/83, 199, 200, 227, 45

[56] References Cited

U.S. PATENT DOCUMENTS

| | | | |
|---|---|---|---|
| 3,106,766 | 10/1963 | Chadderdon | 29/103 |
| 4,850,757 | 7/1989 | Stashko | 408/199 |
| 5,149,233 | 9/1992 | Kress | 408/199 |
| 5,238,335 | 8/1993 | Nomura | 408/199 |
| 5,328,304 | 7/1994 | Kress | 408/83 |

FOREIGN PATENT DOCUMENTS

| | | | |
|---|---|---|---|
| 4202751 | 8/1993 | Germany . | |
| 0207703 | 10/1985 | Japan | 408/145 |

*Primary Examiner*—Jack W. Lavinder

[57] ABSTRACT

A single-blade reamer is guided in a hole by means of at least one guide fillet. The guide fillet is provided with a coating of cubical boron nitride (CBN) in the region of its guide surface facing the wall of the hole. The guide fillet thus withstands heavier loads, so that the reamer is suitable in particular for the economical machining of hardened steel alloys.

7 Claims, 2 Drawing Sheets

SINGLE-BLADE REAMER

BACKGROUND OF THE INVENTION

1. Field of the Invention

The invention relates to a single-blade reamer having a blade head with a blade plate and at least one grinding fillet.

2. Relevant Prior Art

Single-blade reamers are of a type known per se and serve for the finishing of holes in workpieces. The guiding of the reamer in the workpiece, which is effected with the aid of at least one guide fillet, is of particular importance. A problem in this connection consists in that, because of the friction of the guide surface of the guide fillet against the wall of the hole, various disturbance effects may occur, which then give rise to inaccurate guiding and even premature wear on the guide fillet. It is true that the disturbance effect of friction is reduced if the hole is flushed with a cooling liquid, usually containing lubricating additives. However, because disposal of this cooling liquid is expensive, there is a tendency to reduce as much as possible the portion added. In contrast to the presently usual guide fillets of bright hard metal, a remedy was therefore sought by proposing coatings of mixed ceramic material in German patent document DE 39 24 998 A1, or plastic material in German patent document DE 40 07 175 A1, and finally of diamond in German patent document DE 42 02 751 A1. The basic principle of these partly contradictory coatings is reduction of friction on the one hand through the self-lubricating property of plastic materials, and on the other hand through the extreme hardness of diamonds. In addition, the affinity of the coating for the material of the workpieces should be so reduced that welding-on of the material is avoided.

It has now been found that the effect hoped for, particularly from diamond coating, although it was for example achieved in the case of aluminum materials, was nevertheless absent in the machining of hardened steel alloys. There is however now an increasing tendency in the manufacturing industry not to effect the hardening of steel parts after the reaming, because this leads to changes of shape, but to carry out the precision reaming of the holes after the hardening. This requirement can be met only inadequately with present guide fillet designs, either because the reaming power is low or the addition of a considerable amount of lubricant is necessary, or because rapid wear of the guide fillets must be accepted.

SUMMARY OF THE INVENTION

The object of the invention is to provide a single-blade reamer of the relevant generic type that permits economical machining of hardened steel alloys, in particular.

This object is achieved by a single-blade reamer having a blade head with a blade plate and at least one guide fillet having a guide surface thereon. The guide fillet has a main body of hard metal provided with a coating forming at least a part of the guide surface of the guide fillet, wherein the coating comprises cubical boron nitride (CBN).

Contrary to the prevailing! conception, the invention does not use for the coating the material which is at the present time the hardest, but prioritizes other material criteria in the selection of materials. It has thus been found that, despite having lower hardness than diamond, CBN makes up for this aspect by a number of other advantages. The explanation for this is as follows: the diamond coating consists, to be exact, of polycrystalline diamond (PCD) with a cubical carbon lattice (C lattice), grain intergrowth being achieved during synthesis by solution precipitations of carbon under diamond-stable conditions with the aid of the solvent catalyst, cobalt. This cobalt remains embedded between the diamond grains and at the high temperatures attained in the machining of steel then reverses its function as a solution catalyst and brings about the conversion of the cubical C lattice (diamond) into a hexagonal C lattice (graphite). The hard diamond coating is therefore degraded. In addition, cobalt has a volumetric thermal expansion four times greater than that of diamond and therefore at temperatures above approximately 800° C. bursts the diamond layer, in which cracks are thus formed. CBN, on the other hand, is chemically stable up to 1200° C. and the binding matrix is produced without a catalyst.

Another aspect consists in that PCD has a thermal expansion approximately three times that of the hard metal of the main body. As soon as temperatures above 900° C. occur at points, the very different expansions of the main body and the coating gives rise to delamination, whereby overall strength is impaired. On the other hand, CBN has a coefficient of thermal expansion which differs only slightly from that of the main body of hard metal, so that up to a far higher working temperature no disturbing stresses occur between the main body and the coating.

Another advantage of CBN is its considerably lower thermal conductivity in comparison with PCD. The heat produced on the guide surface by friction is thus conducted less quickly into the main body and then further into the blade head, remaining instead concentrated on the zone of contact between the CBN layer and the wall of the hole. The desired smoothing effect on the wall of the hole is thereby improved. Because of the overall greater stability and thermal stability of the CBN coating, hardened steel alloys can be machined in an economically interesting manner with the reamer according to the invention, so that an important field of application is opened up.

The general shape (length, width, curvature) of guide surfaces is known per se and depends, among other factors, on the axial length of the cutting edge of the blade and also on the properties of the workpiece. If, for example, larger cavities are intersected by the hole which is to be machined, in these sectors there is no hole wall against which the guide fillets can be supported. The guide fillets must therefore be long and/or wide enough to extend at least to the edge regions of such sectors. In the case of guide surfaces that as a whole are smaller, it is expedient to coat the entire guide surface. In the case of larger guide surfaces, complete coating may be necessary when it is intended to work with a cooling liquid extremely low in grease. Under less stringent operating conditions, on the other hand, partial coating, e.g., at the front of the guide surface in the direction of movement relative to the workpiece or extending only over half the guide surface is more economical. The coating is then applied only where the main load occurs.

The partial coating can to a certain extent be allowed to project above the uncoated area, thereby facilitating production. However, the uncoated part then makes no contribution to the support of the reamer. In an alternate configuration, the coating is applied to an area of the guide fillet that is set back radially relative to the axis of the drill. Thus, the outer surface of the coating adjoins the uncoated area of the guide surface without a step. The uncoated part still advantageously has a supporting function. The specific load is lower, so that a protective film of cooling liquid is maintained over the uncoated part.

Two guide fillets are provided in the type of single-blade reamer most usually encountered. For less severe working conditions, it is advisable to coat only one guide fillet for reasons of cost. That guide fillet is arranged directly following the blade plate, in the direction of movement relative to the workpiece. It is coated with CBN, at least over that area of its guide surface which lies at the front in the direction of movement. This guide fillet, which immediately follows the cutting zone, in fact smooths the wall of the hole, so that the second guide fillet, which then slides on the wall of the hole, already encounters better contact conditions, which can be dealt with even by an uncoated guide surface.

BRIEF DESCRIPTION OF THE DRAWINGS

Further developments and improvements of the invention will emerge from the following description of preferred embodiments, which is illustrated in the drawing, in which.

DETAILED DESCRIPTION OF PREFERRED EMBODIMENTS

Figure 1:
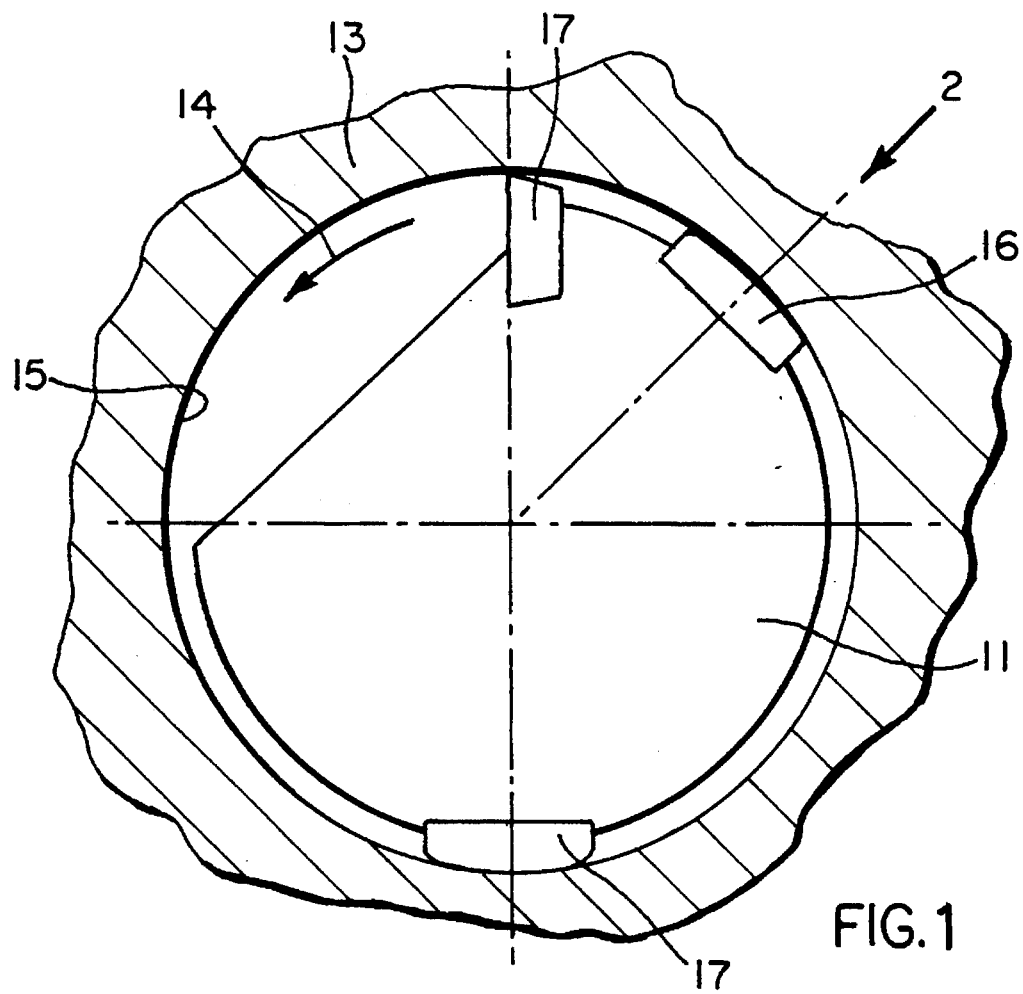
FIG. 1 shows a schematically simplified front view of a single-blade reamer in the hole in a workpiece.

The general construction of single-blade reamers is known per se and therefore need not be described in detail. A single-blade reamer generally comprises a blade head 11, in which a blade plate 12 projecting above the periphery is mounted interchangeably and preferably radially adjustably. The blade head 11 turns in the direction of the arrow 14 relative to a workpiece 13, the cutting edge of the blade plate 12 machining a hole 15. In the construction comprising two guide fillets the first guide fillet 16 lies in the first quadrant behind the blade plate 12, generally in a position with a 45° lag, while the second guide fillet 17 lies approximately diametrically opposite the blade plate 12.

Each guide fillet, or at least the guide fillet 16 which is described more fully as a preferred embodiment, is constructed as follows. It consists of a main body 18 of inherently customary type, made of hard metal and having a generally flat prismatic shape. The main body 18 is fastened on the blade head 11, preferably being let into a holding slot. It is soldered or adhesively bonded in place. The flat side pointing radially outwards is curved to match the diameter of the hole 15 and forms a guide surface 19. An area 21 that extends approximately over half the guide surface 19, viewed in the direction of movement 14, is in this embodiment the bright ground surface of the main body 18 or a thin coating of hard material. An area 22 lying at the front in the direction of movement 14 is provided with a coating of cubical boron nitride (CBN). This means that the CBN crystals are bound into a matrix that for example contains titanium carbide and that is applied to the surface of the guide fillet. The crystals projecting toward the outside then form the actual guide surface. If desired, this crystal outer surface can be reground and polished accurately to the required shape and smoothness by means of a diamond grinding wheel. This is another advantage of the use of a material which is not at the top of the hardness scale.

Figure 3:
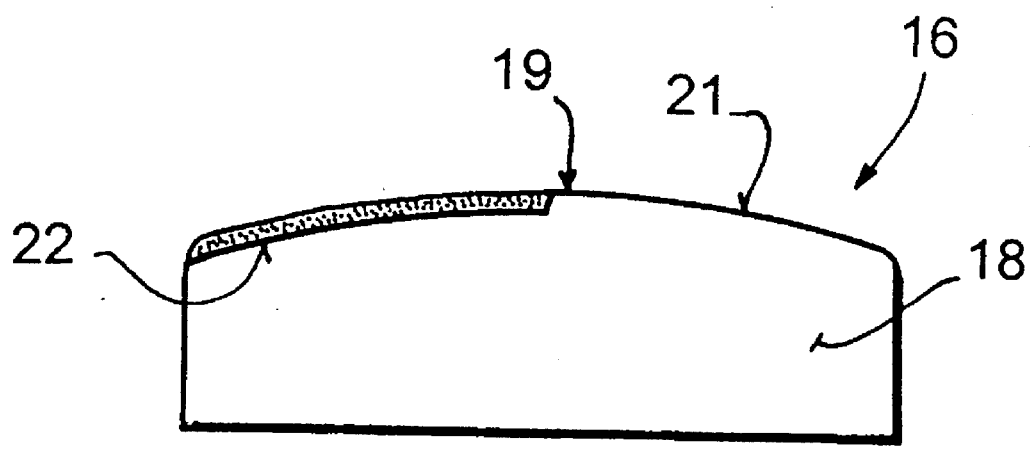
FIG. 3 shows a side view of a further variation according to the invention.

In a variant, shown in FIG. 3, the front area 22 of the guide surface 19 is in the form of an area which is set back at a radial distance from the axis of the drill and to which the CBN coating is then applied. It is thereby ensured that the crystal outer surface adjoins the area 21 without a step. Both the areas 21 and 22 can then be operative.

Figure 2:
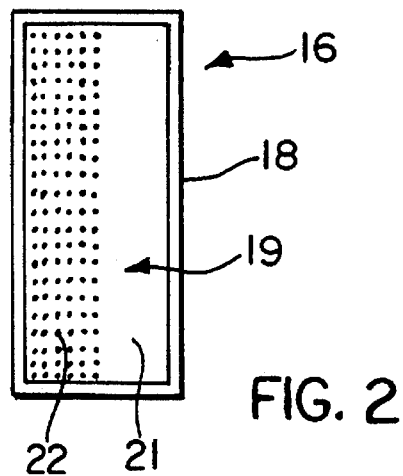
FIG. 2 shows a plan view of a guide fillet according to a variation of the invention.

Depending on the curvature of the guide surface 19 (which is fixed in accordance with criteria known per se) relative to the bore 15, the main load zone of the guide surface 19 may lie in various positions. It is obvious that the CBN coating should in any case extend over this main load zone. The position shown in FIG. 2 is only an example. The entire guide surface 19 can of course also be uniformly coated.

Although in the foregoing the main body 18 has been described as consisting of hard metal, this expression is intended to include materials having similar properties. Thus, the main body may for example consist of cermet. In addition, the main body of the guide fillet may be formed integrally with the blade head. Differentiation between the boade head and the guide fillet is then not made by spatial separation but by division of functions.

The expression "coating" is also only a representative expression and is used for simplicity of description. It also includes application of a CBN layer or facing. The difference is that a coating acquires a defined shape only when it is fixed to the surface of the main body, somewhat like sprayed paint, whereas a layer assumes an independently stable spatial shape, for example in the form of a lamina, before it is attached to the main body.

I claim:

1. A single-blade reamer having a blade head comprising a blade plate head comprising a blade plate and at least a first guide fillet having a guide surface thereon, said guide fillet comprising a main body of hard metal provided with a coating forming at least a part of the guide surface of the guide fillet, wherein the coating comprises a cubical boron nitride (CBN).

2. A single-blade reamer as claimed in claim 1, wherein the guide surface (19) is provided with the coating on its entirety.

3. A single-blade reamer having a blade head comprising a blade plate head comprising a blade plate and at least a first guide fillet having a guide surface thereon, said guide fillet comprising a main body of hard metal provided with a coating forming at least a part of the guide surface of the guide fillet, wherein the coating comprises a cubical boron nitride (CBN), said guide fillet has a front area on its guide surface, and only said front area (22) of the guide surface is provided with the coating.

4. A single-blade reamer as claimed in claim 3, wherein the front area of the guide surface (22) extends approximately over half the guide surface (19).

5. A single-blade reamer as claimed in claim 3, wherein a front area of the guide fillet (16) on which the coating is provided is setback radially relative to an axis of the single-blade reamer, so that the guide surface formed by the coating adjoins without a step an uncoated area (21) of the guide surface (19).

6. A single-blade reamer as claimed in claim 4, wherein a front area of the guide fillet (16) on which the coating is provided is setback radially relative to an axis of the single-blade reamer, so that the guide surface formed by the coating adjoins without a step an uncoated area (21) of the guide surface (19).

7. A single-blade reamer having a blade head comprising a blade plate head comprising a blade plate and at least a first guide fillet having a guide surface thereon, said guide fillet comprising a main body of hard metal provided with a coating forming at least a part of the guide surface of the guide fillet, wherein the coating comprises a cubical boron nitride (CBN), further comprising a second guide fillet (17), that is positioned further from the blade plate than the first guide fillet, and wherein at least the first guide fillet (16) has at least a front area on its guide surface that is provided with the coating.

* * * * *